United States Patent
Menendez et al.

(10) Patent No.: US 7,780,899 B2
(45) Date of Patent: Aug. 24, 2010

(54) PROCESS AND TOOLING FOR REDUCING THERMALLY INDUCED RESIDUAL STRESSES AND SHAPE DISTORTIONS IN MONOLITHIC COMPOSITE STRUCTURES

(75) Inventors: José Manuel Menendez, Madrid (ES); Augusto Perez Pastor, Madrid (ES)

(73) Assignee: Airbus Espana S.L., Madrid (ES)

( * ) Notice: Subject to any disclaimer, the term of this patent is extended or adjusted under 35 U.S.C. 154(b) by 138 days.

(21) Appl. No.: 10/795,800

(22) Filed: Mar. 8, 2004

(65) Prior Publication Data
US 2005/0127576 A1 Jun. 16, 2005

(30) Foreign Application Priority Data
Dec. 16, 2003 (EP) .................................. 03380292

(51) Int. Cl.
*B32B 37/00* (2006.01)
*B28B 7/30* (2006.01)
(52) U.S. Cl. .................. 264/511; 264/257; 264/258; 264/313; 264/319; 264/544; 264/553; 264/571; 156/245; 156/285; 156/306.6; 156/307.1
(58) Field of Classification Search .................. None
See application file for complete search history.

(56) References Cited

U.S. PATENT DOCUMENTS

| | | | | |
|---|---|---|---|---|
| 5,242,523 | A * | 9/1993 | Willden et al. | 156/285 |
| 5,817,269 | A * | 10/1998 | Younie et al. | 264/258 |
| 6,045,651 | A * | 4/2000 | Kline et al. | 156/285 |
| 6,245,275 | B1 * | 6/2001 | Holsinger | 264/257 |
| 6,306,239 | B1 * | 10/2001 | Breuer et al. | 156/245 |
| 6,508,909 | B1 * | 1/2003 | Cerezo Pancorbo et al. | 156/306.6 |
| 6,733,907 | B2 * | 5/2004 | Morrison et al. | 428/699 |
| 2002/0173575 | A1 * | 11/2002 | Artz et al. | 524/451 |

FOREIGN PATENT DOCUMENTS

| | | | |
|---|---|---|---|
| EP | 1 136 236 | | 9/2001 |
| EP | 1134070 | * | 9/2001 |
| EP | 1 231 046 | | 8/2002 |
| JP | 58203014 | * | 11/1983 |

OTHER PUBLICATIONS

Coefficients of Friction for Rubber, The Physics Factbook, Edited by Glen Elert, 2005, 2 pages.*

* cited by examiner

*Primary Examiner*—Jeffrey Wollschlager
(74) *Attorney, Agent, or Firm*—Ladas and Parry LLP

(57) ABSTRACT

Process for manufacturing monolithic composite structures comprising providing first and second subcomponents (1, 2) of composite material, attaching an expansion compensating tooling to the second subcomponent, placing the second subcomponent along with said tooling on the first subcomponent and bonding it to the latter by means of an uncured structural adhesive, covering the assembly comprising the first and second subcomponents and the tooling with a vacuum bag, performing an autoclave cycle for curing the curable material contained in said assembly under high temperature and pressure conditions, withdrawing said assembly from the curing autoclave and removing the expansion compensating tooling to obtain the desired monolithic composite structure. The tooling for carrying out the process comprises metal L- or I-shaped beams having a rough surface adapted to be applied to the second subcomponent. The invention is useful for manufacturing aircraft parts.

8 Claims, 5 Drawing Sheets

PROCESS AND TOOLING FOR REDUCING THERMALLY INDUCED RESIDUAL STRESSES AND SHAPE DISTORTIONS IN MONOLITHIC COMPOSITE STRUCTURES

FIELD OF INVENTION

The invention relates to manufacturing of advanced composite structures using high temperature consolidation processes (curing and bonding), and to improvement in the tooling for composite manufacturing.

Anisotropy of mechanical properties of fibre reinforced composite materials allows an effective design optimisation of the structures manufactured with them. However, there are important limitations associated to this anisotropy. A particular case is the bonding at high temperature of elements with very dissimilar expansion coefficients, situation that can promote thermal induced residual stresses and shape distortions during the cooling phase of the thermal cycle.

This effect can be reduced or even avoided in monolithic structures with precured subcomponents. The invention consists in a tooling that grips one ore more of these precured sub-components during the thermal cycle. A correct modulation of the expansion coefficient/Young modulus of this tooling allows an effective control of the differential expansion of the subcomponents of the structure and, subsequently, the induced residual stresses and distortion.

BACKGROUND OF INVENTION

Advanced composite materials are used in the aircraft industry due to their optimum specific mechanical properties when compared with equivalent metallic parts. These properties are a consequence of the high specific properties of the reinforcing fibres (graphite in most cases) and their directionality: an adequate combination of layers with different fibre orientations allows a high optimisation of the mechanical properties of the resultant laminate.

However, this directionality is extensive to the thermo-mechanical behaviour of composite materials, as reinforcing fibres and resins commonly used as matrix (epoxy in most cases) have very dissimilar expansion coefficients, circumstance that promotes a very anisotropic expansion coefficient, which is very low, even negative in the direction of the reinforcement ($-2.10^{-6}$ to $3.10^{-6°}$ $C.^{-1}$), and in the range of $3.10^{-5}$ to $6.10^{-5°}$ $C.^{-1}$ in the transversal direction.

This thermo-mechanical anisotropy complicates the optimisation of flat laminates (and forces to use symmetric and equilibrated ply stacking sequences), curved laminates (this case is specially sensible, and usually requires a complex tailoring of the tooling), and monolithic stiffened structures.

In the last case, an optimum structural optimisation of a manufactured part of an aircraft would required the use of very different stacking sequences for the skin and stiffeners of an aircraft, situation that inexorably drives to highly stressed or distorted structures. A modification in the stacking sequences can reduce this effect, but with an undesirable weight penalty.

This effect can be theoretically predicted, and thermal induced distortions can be reduced or corrected with an adequate design of the tooling (the shape of the tooling must be corrected in order to compensate the predicted deformation of the part to be manufactured). However, this method is always expensive (in most cases it complicates the manufacture of the tooling), very inaccurate, as deformation depends on many variables (with a high risk of scraps as a consequence), and non flexible (a slight modification in the part makes the tooling unusable).

A process for manufacturing composite material primary structures with curing female tooling has been disclosed in EP-A-1 136 236. Also, EP-A-1 231 046 discloses a method for manufacturing elements of composite materials by the co-bonding technique.

BRIEF DESCRIPTION OF THE INVENTION

In view of the above it is a broad object of this invention to provide a process and tooling that leads to the reduction of thermally induced residual stresses and shape distortions of monolithic composite structures during the cooling phase of the thermal cycle. The part here considered to be manufactured is any one composed of at least two subcomponents (generally a skin and one or several stiffeners, or a stiffening complex structure), of which at least one is precured, bonded together at high temperature.

In a first embodiment of the invention, the composite part is composed of one or several uncured subcomponents, and one or several precured subcomponents. The tooling comprises a tool that supports and moulds the shape of the uncured sub-components, and the expansion compensating tooling, that grips the precured subcomponent during the curing cycle.

In a further embodiment of the invention, the composite part is composed by several precured subcomponents. The tooling comprises tools to support the subcomponent to be bonded, and the expansion compensation tooling, that grips the precured subcomponent during the curing cycle.

Specifically, in a first aspect the invention provides a process for manufacturing monolithic composite structures comprising precured subcomponents, or a combination of uncured resin preimpregnated fibre reinforced composite layers ("prepregs") and precured subcomponents, using special tooling to modulate the thermal expansion of the precured subcomponents, comprising the steps of: providing at least a first subcomponent of composite material; providing at least a second subcomponent of composite material; attaching an expansion compensating tooling to the second subcomponent, the surface of said tooling that makes contact with the second subcomponent being a rough surface to promote enough friction to achieve a common expansion of both elements when subjected to a heating cycle; placing the second subcomponent along with said tooling on the first subcomponent and bonding it to the latter by means of an uncured structural adhesive; covering the assembly comprising the first and second subcomponents and the tooling with a vacuum bag; performing an autoclave cycle for curing the curable material contained in said assembly under high temperature and pressure conditions; withdrawing said assembly from the curing autoclave; and removing the expansion compensating tooling to obtain a monolithic composite structure consisting of both subcomponents bonded by the cured structural adhesive.

The provided subcomponents can be precured. Alternatively, the first subcomponent can be precured and the second subcomponent can be uncured, the later being cured during the autoclave cycle.

Preferably, the first subcomponent can be an aircraft skin and the second subcomponent can be a stiffener for same.

According to the invention, the used expansion compensating tooling can consist of L-shaped metal beams or I-shaped metal beams adapted to the geometry of the second subcomponent.

Preferably, the rough surface of said beams can be a machined surface. Alternatively, it can be a surface having an attached friction enhancer selected from sandpaper and the like.

The invention can be used without limitation with any kind of reinforcement (graphite, glass fibre, etc.) and matrix (thermoset or thermoplastic) used in the manufacturing of composite materials, and without limitations of pressure and temperature (in the ranges of pressures and temperatures recommended by the manufacturers of the raw materials).

In a second aspect, the invention also provides a tooling for carrying out the above process comprising metal beams having a rough surface adapted to be applied to said second subcomponent.

Preferably, said beams can be L-shaped beams. Alternatively, they can be I-shaped beams.

Preferably, the rough surface of said beams can be a machined surface. Alternatively, can be a surface having an attached friction enhancer selected from sandpaper and the like.

BRIEF DESCRIPTION OF THE DRAWINGS

This invention will be better understood when taken in conjunction with the attached drawings wherein:

FIG. 4 is a perspective view of the sample of FIG. 1, with an embodiment of the tooling of the invention: in this case two metallic "L" beams adapted to the stiffener. The internal face of the tooling, in contact with the stiffener, must have a rough surface to promote the grip of the tooling with the stiffener: a machined surface, or a bonded sandpaper or similar.

DETAILED DESCRIPTION OF THE INVENTION

Figure 1:
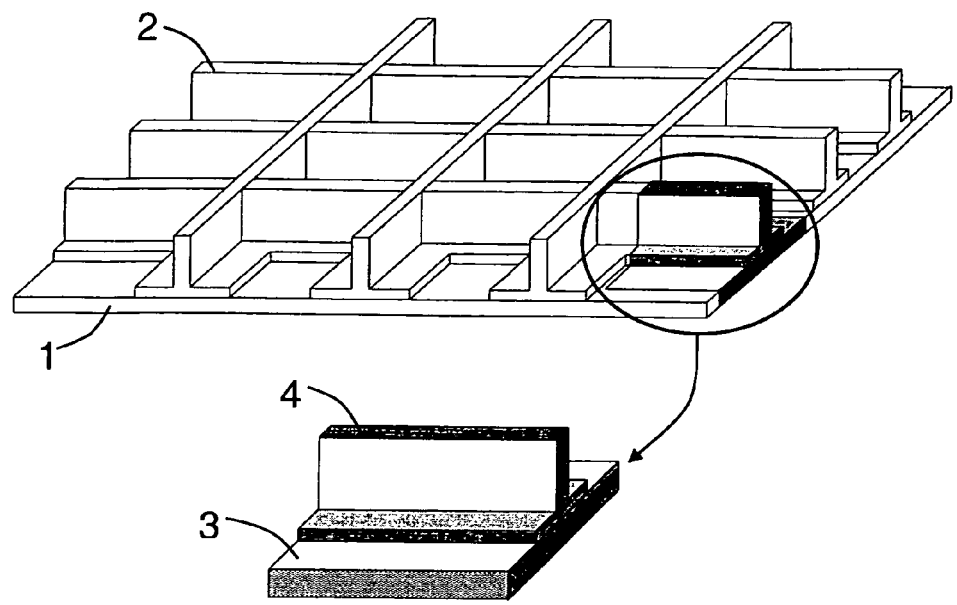
FIG. 1 is a perspective view of a monolithic composite part composed of a skin and a stiffening structure, and a detail of the part composed of a portion of skin and a portion of a stiffener, that will be used as a sample to explain the operation principles of the invention.

Considering as example the part represented in FIG. 1, a structure is shown composed of a skin 1, that can be cured or uncured, and a precured stiffening structure 2. In order to simplify the problem, we will consider a small area of the structure, consisting of a portion of skin 3 and the correspondent stiffener 4.

Figure 2:
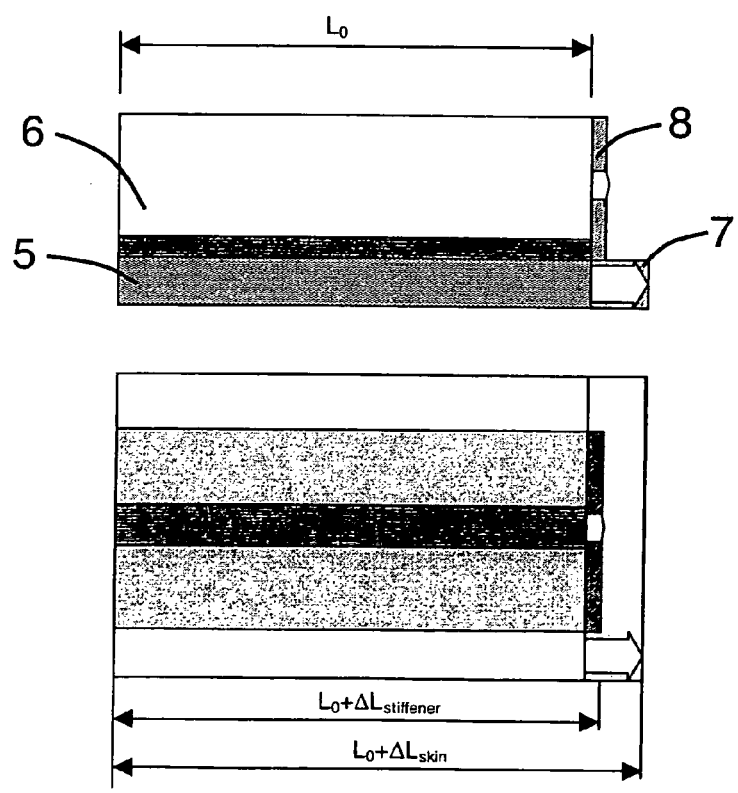
FIG. 2 is a side elevational view and a top plan view of the sample of FIG. 1 during the heating phase of the high temperature assembly process according to the prior art. The expansion coefficients of the skin and the stiffener are different and, as they are still not bonded, there is a relative movement between both elements.

The structure will be consolidated in a curing process, in which a temperature and pressure cycles are applied. FIG. 2 is shows a side elevational view and a top plan view of the sample of FIG. 1 during the heating phase of the high temperature assembly process according to the prior art. If the stacking sequence of the skin 5 and the stiffener 6 are different, its expansion coefficients are also different and during an initial part of the cycle, before the consolidation of the skin and the adhesive, which happens at a temperature higher the than initial room temperature, the evolutions of skin and stiffener are independent.

Figure 3:
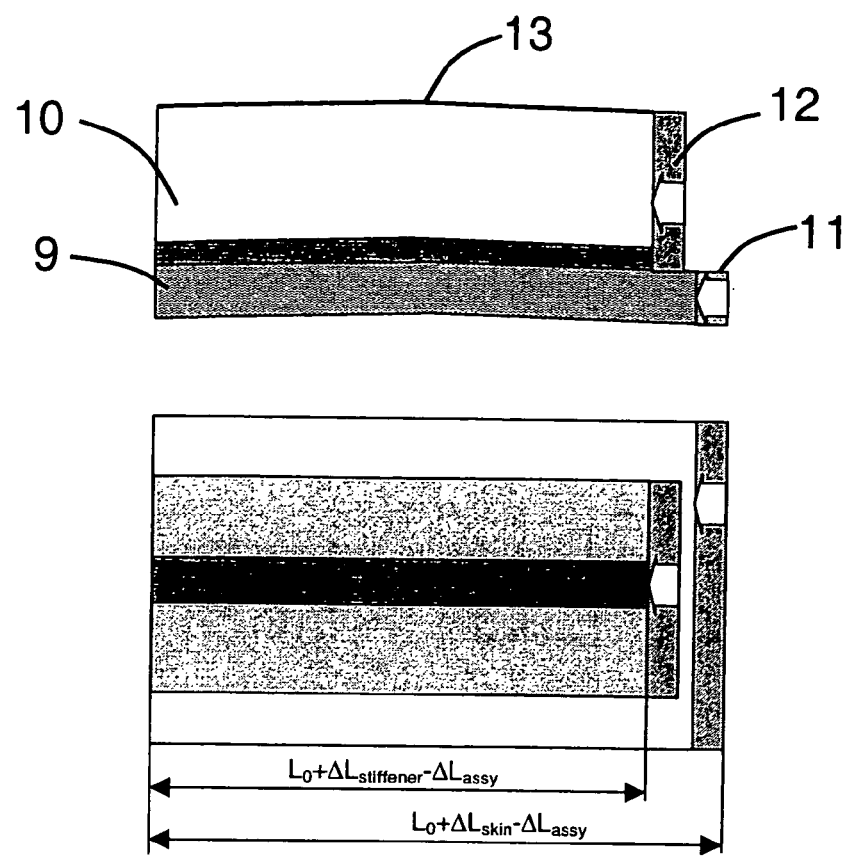
FIG. 3 is the same view of FIG. 2 but during the cooling phase of the high temperature assembly process according to the prior art. As the skin and the stiffener have been consolidated at high temperature, the relative moment has become a permanent shift between both elements. Moreover, the different degree of contraction of skin and stiffener may result in a deformation out of the plane of the laminate.

After this consolidation, and during the cooling phase of the prior art process, shown in FIG. 3, there must be a compatibility of displacements/deformations between skin 9 and stiffener 10, that is, the contraction 11 of the skin ($\Delta L_{skin}$) and the contraction 12 of the stiffener ($\Delta L_{stiffener}$) are equal, fact reflected in the following equation (1):

$$\Delta L_{skin} = \Delta L_{stiffener} = \Delta L \quad (1)$$

The increment of length has a mechanical and a thermal component, that is:

$$\Delta L = \Delta L_T + \Delta L_M$$

where the thermal component can be expressed as a linear function of the temperature:

$$\Delta L_T = \alpha \Delta T$$

and the mechanical component can be expressed as:

$$\Delta L = \epsilon_M L_0$$

where the mechanical strain $\epsilon_M$ is related to the mechanical stress $\sigma$, and to the applied force F through the Young's Law:

$$\varepsilon_M = \frac{\sigma}{E} = \frac{F}{AE}$$

FIG. 2 shows the increments 7 and 8 of the length of the skin and the stiffener respectively, which are then:

$$\Delta L_{skin} = (\Delta L_T)_{skin} + (\Delta L_M)_{skin}$$

$$\Delta L_{stiffener} = (\Delta L_T)_{stiffener} + (\Delta L_M)_{stiffener}$$

where $$(\Delta L_T)_{skin} = \alpha_{skin} \Delta T$$

$$(\Delta L_T)_{stiffener} = \alpha_{stiffener} \Delta T$$

and $$(\Delta L_M)_{skin} = \frac{L_0}{A_{skin} E_{skin}} F_{stiffener\ over\ skin}$$

$$(\Delta L_M)_{stiffener} = \frac{L_0}{A_{stiffener} E_{stiffener}} F_{skin\ over\ stiffener}$$

The assembly skin+stiffener it is not an isolated system. There is an interaction with the tooling and the ancillary materials, typically the resultant of the pressure of the vacuum bag and the tooling (both equilibrated, and responsible of maintaining the geometry and compactness of the part), and the correspondent friction forces. However, and for simplification purposes, friction will not be, in this case, considered.

Then, and during the cooling of the part, the forces applied by the skin 9 over the stiffener 10 will be equilibrated, that is:

$$F_{stiffener\ over\ skin} + F_{skin\ over\ stiffener} = 0 \tag{2}$$

From equations (1) and (2), $\Delta L$ can then be expressed as a function of $\Delta T$:

$$\Delta L = \frac{A_{skin}E_{skin}\alpha_{skin} + A_{stiffener}E_{stiffener}\alpha_{stiffener}}{A_{skin}E_{skin} + A_{stiffener}E_{stiffener}}\Delta T$$

and subsequently, the internal residual stresses stored in the skin and the stiffener during the cooling process are:

$$\sigma_{skin} = E_{skin}\frac{\Delta L}{L_0} = \frac{A_{skin}E_{skin}\alpha_{skin} + A_{stiffener}E_{stiffener}\alpha_{stiffener}}{A_{skin}E_{skin} + A_{stiffener}E_{stiffener}}\frac{E_{skin}}{L_0}\Delta T$$

$$\sigma_{stringer} = E_{stiffener}\frac{\Delta L}{L_0}$$
$$= \frac{A_{skin}E_{skin}\alpha_{skin} + A_{stiffener}E_{stiffener}\alpha_{stiffener}}{A_{skin}E_{skin} + A_{stiffener}E_{stiffener}}\frac{E_{stiffener}}{L_0}\Delta T$$

When the part is still in the mould, the pressure of the vacuum bag holds the part against the tooling. However, when the part is released, the asymmetry of stresses promotes a distortion of the part 13.

Figure 4:
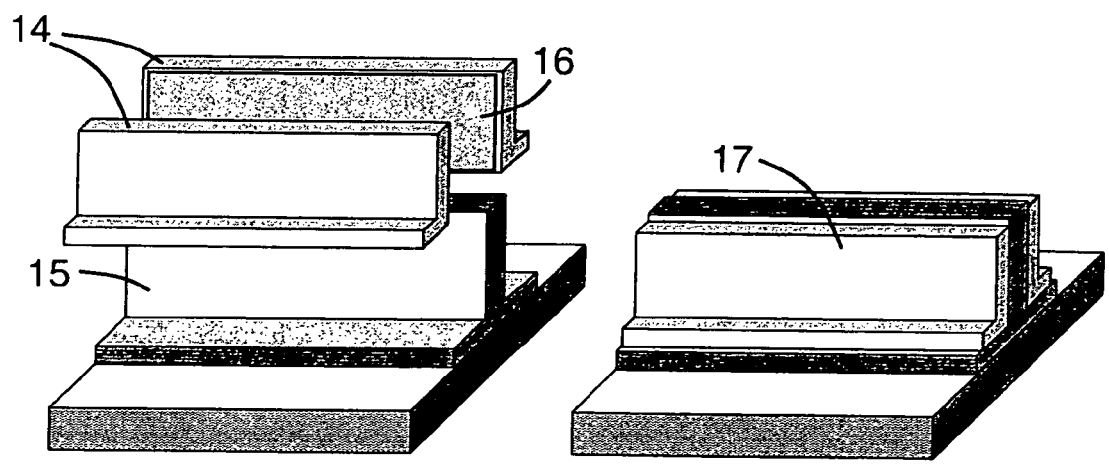

FIG. 4 shows a simple representation of an embodiment of the expansion compensating tooling, in this case two "L" beams 14 adapted to the geometry of the stiffener 15. The setup of the vacuum bag would be the same as the standard, except that the stiffener incorporates the mentioned tooling.

The tooling has to be firmly fixed to the stiffener 17, so a mechanism to fix both elements has to be implemented, for instance pins, bolts, etc. In an embodiment of the invention, the surface of the tooling in contact with the stiffener is mechanised to get a rough surface 16 that, in combination with the pressure of the vacuum bag and the autoclave, promotes enough friction to get a common expansion of both elements.

In another embodiment of the invention, an external element with a rough surface is attached to the stiffener to get the same effect (a sandpaper or similar bonded at high temperature, for example).

Figure 5:
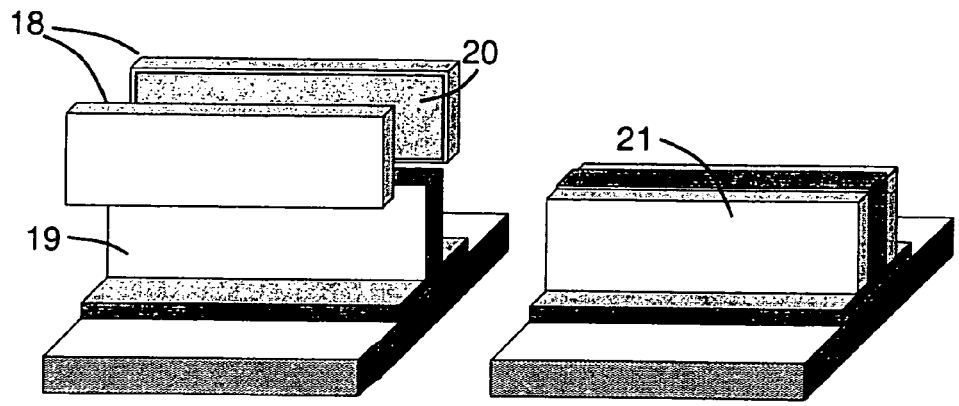
FIG. 5 is the same view of FIG. 4, with a second embodiment of the tooling of the invention: in this case, two metallic "I" beams adapted to the stiffener.

FIG. 5 shows a second embodiment of the expansion compensating tooling. In this case, two "I" beams 18 (also with their internal surface mechanised or provided with an attached friction enhancer 20) adapted to the web of the stiffener 19.

Figure 6:
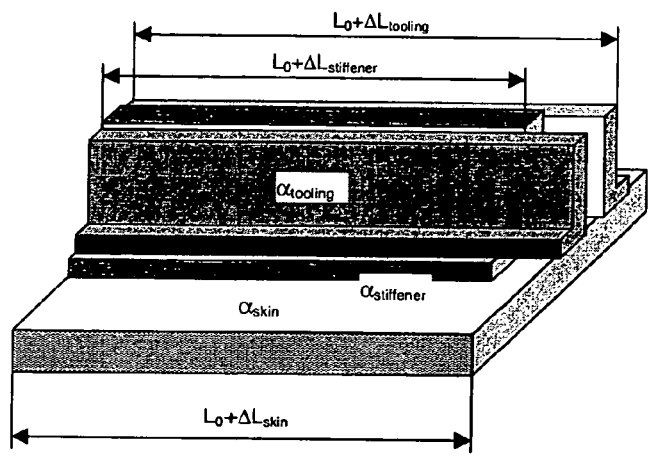
FIG. 6 is the same view of FIG. 4, during the heating phase of the high temperature assembly process, but without the pressure of a vacuum bag applied. Skin, stiffener and tooling expand with their own individual expansion coefficients.

FIG. 6 shows the effect on skin, stiffener and tooling if heating without the pressure of the vacuum bag was applied. Skin, stiffener and tooling expand with their own individual expansion coefficients.

Figure 7:
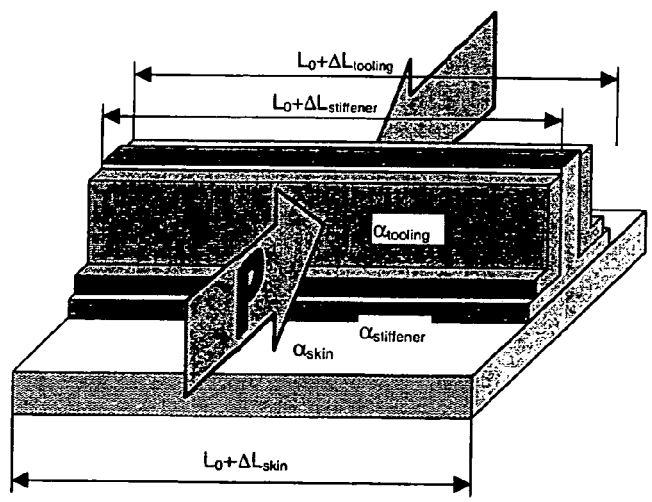
FIG. 7 is the same view of FIG. 4, during the heating phase of the high temperature assembly process. Pressure of the vacuum bag and an autoclave is applied, and skin, stiffener and tooling expand with a common expansion coefficient.
Figure 8:
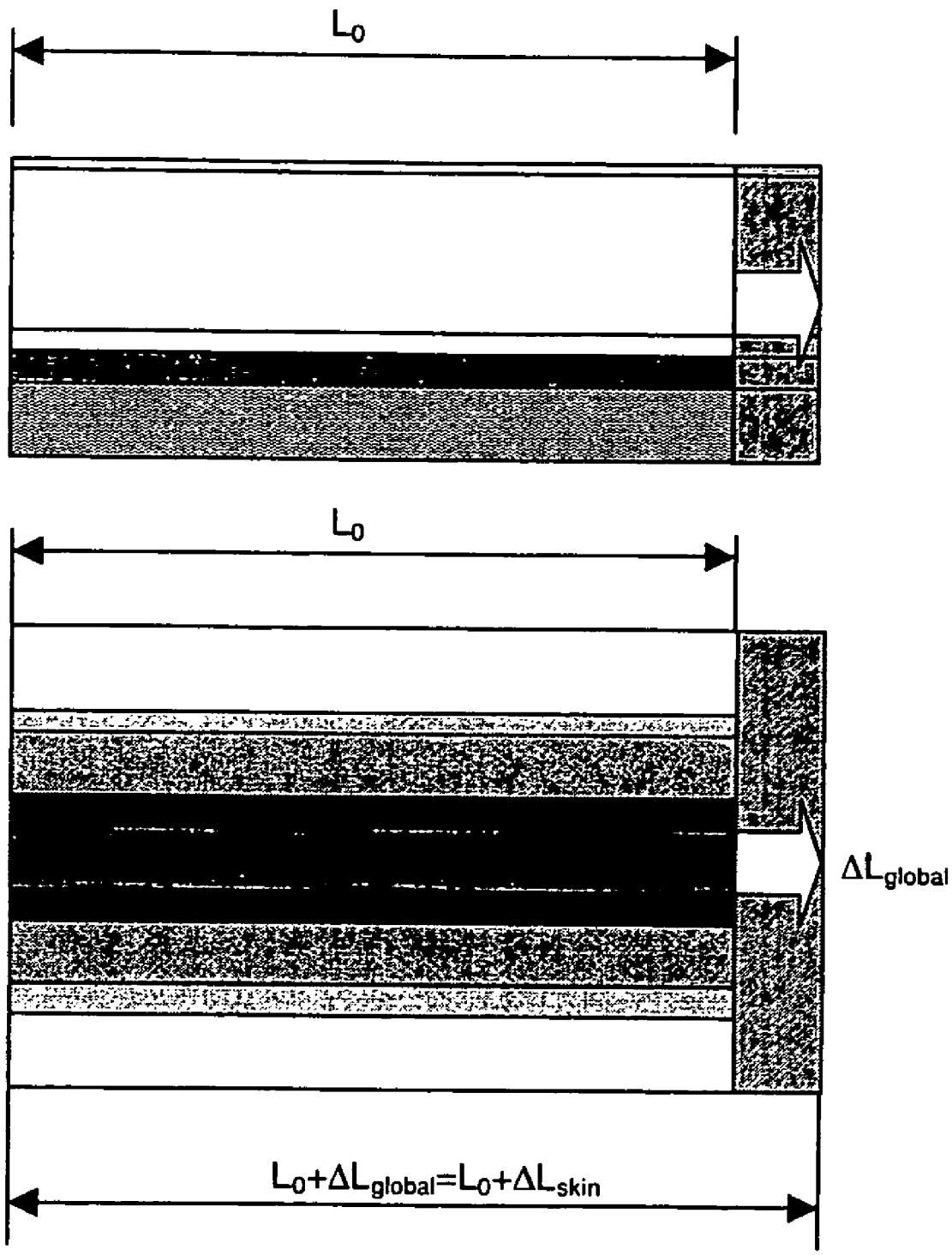
FIG. 8 is a side elevational view of the FIG. 7, showing in detail the behaviour of each element during the heating and consolidation of the part to be manufactured.

Applying to the pair stiffener+expansion compensating tooling gripped by the effect of the friction the same equations as for the skin and the stiffener can be applied, and the common increment in length is given by (FIG. 7 and FIG. 8):

$$\Delta L = \frac{A_{tooling}E_{tooling}\alpha_{tooling} + A_{stiffener}E_{stiffener}\alpha_{stiffener}}{A_{tooling}E_{tooling} + A_{stiffener}E_{stiffener}}\Delta T$$

Making this increment in length and the thermal increment in length of the skin equal, it is possible to obtain the stiffness of the tooling required to compensate the thermal expansion of the skin and the thermal expansion of the stiffener:

$$\frac{A_{tooling}E_{tooling}\alpha_{tooling} + A_{stiffener}E_{stiffener}\alpha_{stiffener}}{A_{tooling}E_{tooling} + A_{stiffener}E_{stiffener}}\Delta T = \alpha_{skin}\Delta T$$

The result is given in expression (3)

$$A_{tooling}E_{tooling} = \left[\frac{\alpha_{skin} - \alpha_{stiffener}}{\alpha_{tooling} - \alpha_{skin}}\right]A_{stiffener}E_{stiffener} \tag{3}$$

Figure 9:
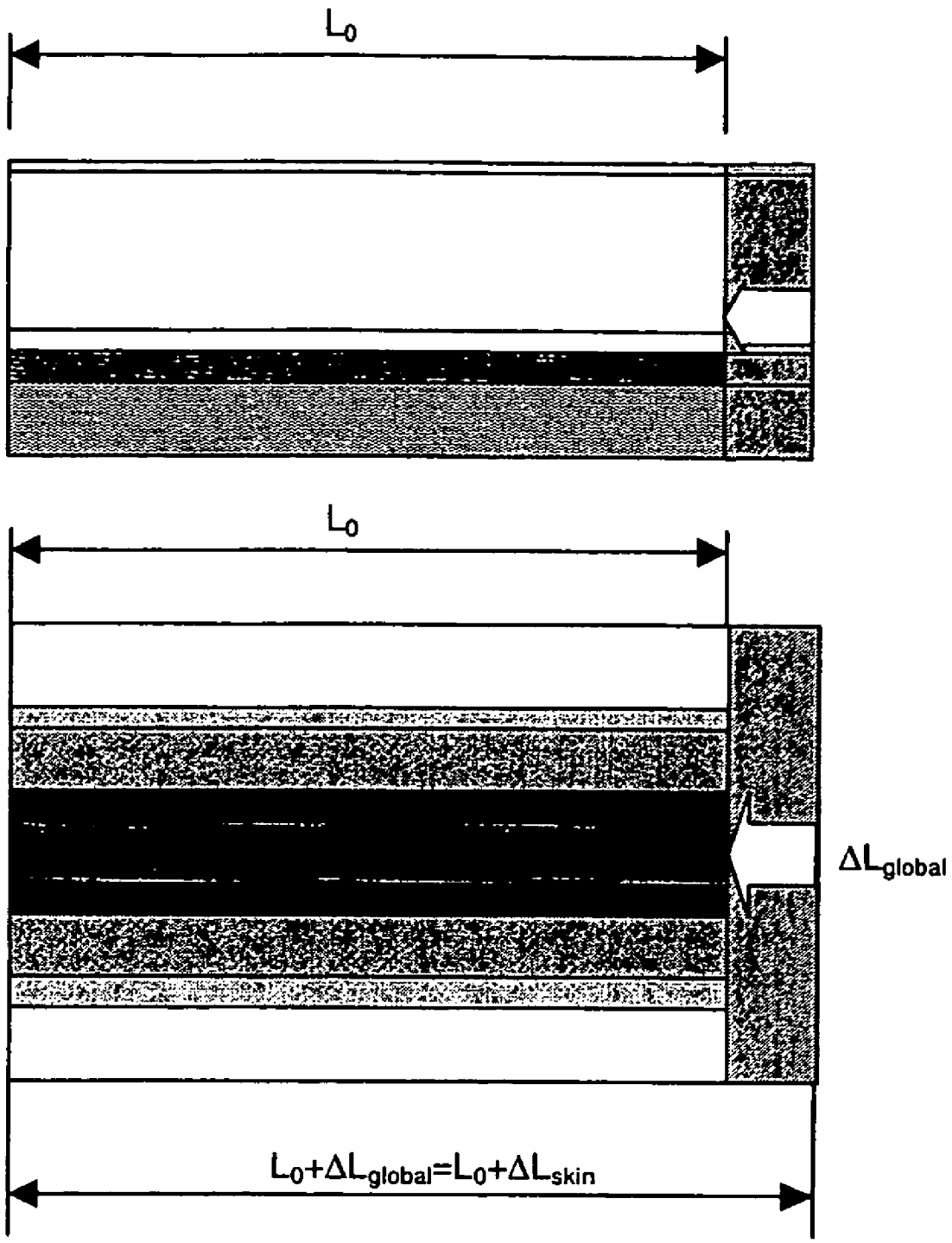
FIG. 9 is the same view of FIG. 8 during the cooling phase of the curing process. In this case, as there is no differential contraction, none out of plane deformation occurs.

FIG. 9 shows the behaviour of the elements skin, stiffener and expansion compensating tooling during the cooling phase of the curing process, in which no out of plane deformation occurs due to the absence of differential contraction.

This invention may be embodied in other specific forms without departing from the spirit or essential characteristics thereof. The present embodiments are therefore to be considered in all respects as illustrative and not restrictive, the scope of the invention being indicated by the appended claims rather than by the foregoing description; and all changes that come within meaning and range of equivalency of the claims are therefore intended to be embraced therein.

The invention claimed is:

1. In a process for assembling a monolithic composite structure from at least one first subcomponent of composite material and at least one second subcomponent of composite material and an autoclave cycle, the improvement comprising the steps of:
   a) assembling the first and second subcomponents into an assembly characterized by:
      1) attaching an expansion compensating tooling (14, 18) to the second subcomponent, said tooling having a coefficient of thermal expansion that differs from said second component and a surface (16,20) of the tooling making contact with the second subcomponent the surface being a machined roughened surface or having a friction enhancer attached thereto and being rough enough to promote friction in an amount effective to achieve thermal expansion of the tooling and the second subcomponent at a common expansion coefficient when subjected to the autoclave cycle under high pressure applied by a vacuum bag and autoclave, said common expansion coefficient being different than an individual expansion coefficient of the second subcomponent and the same as an individual expansion coefficient of the first subcomponent, the respective individual expansion coefficients of the tooling and the second subcomponent being such that expansion of the tooling and the second subcomponent at the common expansion coefficient cannot be achieved without the high pressure of the vacuum bag and autoclave; and 2) bonding the second subcomponent with the tooling on the first subcomponent with uncured structural adhesive;

covering the assembly with the vacuum bag;

performing the autoclave cycle on the assembly for curing the uncured structural adhesive under high temperature and pressure; and withdrawing the assembly and removing the tooling, whereby to obtain the monolithic composite structure comprising the first and second subcomponents bonded by the cured structural adhesive.

2. Process according to claim 1, characterized in that subcomponents (1 and 2) are precured.

3. Process according to claim 1, characterized in that the first subcomponent (1) is precured and the second subcomponent (2) is provided uncured and cured during the autoclave cycle.

4. Process according to claim 1, characterized in that the first subcomponent (1) is an aircraft skin and the second subcomponent is a stiffener therefor.

5. Process according to claim 1, characterized in that the expansion compensating tooling consists of L-shaped metal beams (14) adapted to a geometry of the second subcomponent (2).

6. Process according to claim 1, characterized in that the expansion compensating tooling consists of I-shaped metal beams (18) adapted to a geometry of the second subcomponent (2).

7. Process according to claim 1, characterized in that the friction enhancer is sandpaper.

8. Process according to claim 1, wherein the first and second composite materials are one of the same as or different from each other and optionally characterized by including reinforcement graphite or glass fibre with a thermoset or thermoplastic matrix.

* * * * *